Dec. 14, 1937.   L. V. FOSTER   2,101,935
ANALYZING OCULAR
Filed Feb. 28, 1935

LEON V. FOSTER
INVENTOR

BY *J. A. Ellestad*
ATTORNEY

Patented Dec. 14, 1937

2,101,935

UNITED STATES PATENT OFFICE 2,101,935

ANALYZING OCULAR

Leon V. Foster, Irondequoit, N. Y., assignor to Bausch & Lomb Optical Company, Rochester, N. Y., a corporation of New York Application February 28, 1935, Serial No. 8,675

3 Claims. (Cl. 88—39)

The present invention relates to oculars for microscopes and more particularly to analyzing oculars for examining polarization effects.

In instruments for observing polarization effects, the analyzing prism is so located in the instrument that it is the extraordinary ray which passes through it to the eye or camera. Unless the incident beam is collimated before it enters the prism, the extraordinary emergent ray is markedly astigmatic. To correct this, it has heretofore been the practice to design polarization microscopes as an entirety so that the beam entering the analyzing prism will be collimated. Such instruments are expensive and it has heretofore been impossible to convert a general purpose microscope into a polarization microscope without substantial modification.

One of the objects of the present invention is to provide an analyzing ocular capable of readily converting a general purpose microscope into a polarization microscope. A further object is to provide an analyzing ocular in which the astigmatism of the prism is compensated. A further object is to provide an analyzing ocular having an astigmatic eye lens assembly. Another object is to provide an analyzing ocular in which the eye lens assembly comprises two crossed cylindrical lenses. A still further object is to provide an ocular having an analyzing prism located between the field lens and eye lens assembly. These and other objects and advantages reside in certain novel features of construction, arrangement and combination of parts as will hereinafter be more fully set forth and pointed out in the appended claims.

Figure 1:
Fig. 1 is a front elevation of an ocular embodying this invention.
Figure 1:
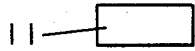
Figure 1:
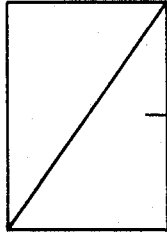
Figure 1:
Figure 1:
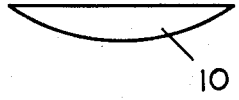
Figure 2:
Fig. 2 is a side elevation of same.
Figure 2:
Figure 2:
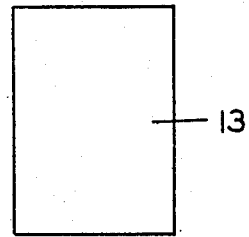
Figure 2:
Figure 2:
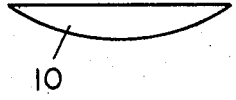

A preferred embodiment of this invention is illustrated in the drawing wherein 10 indicates the spherical field lens of an ocular having an eye lens assembly comprising the plano convex cylindrical lenses 11 and 12. Between the field lens 10 and the eye lens assembly is an analyzing prism 13. A suitable diaphragm 14 is also provided between the field lens 10 and the prism 13. The field lens 10 is a spherical lens 3.6 mm. thick having a radius of curvature of 24.2 mm. The lenses 11 and 12 are plano cylindrical lenses 2.5 mm. thick having radii of curvature of 13.25 mm.

In the embodiment shown, the cylindrical lens 11 is spaced 1 mm. from the emergent face of the prism 13 with its axis parallel to the plane of polarization of the emergent beam. The cylindrical lens 12 is spaced 1.76 mm. from the lens 11 and located with its axis at right angles to the axis of the lens 11. The convex surfaces of lenses 11 and 12 face the field lens 10 and the system functions as a Huygen's ocular.

The light from a microscope objective is refracted by the field lens 10 so that it enters the prism 13 as a converging beam causing the prism 13 to introduce astigmatism into the system. The lenses 11 and 12 form an astigmatic assembly equal and opposite to the astigmatism due to the convergent beam entering the prism and so neutralize it to form an undistorted image. As both the analyzing prism 13 and the compensating lenses 11 and 12 are contained in the ocular, the ocular can be used to convert any general purpose microscope into a polarization microscope without further modification of the instrument.

From the foregoing it is apparent that I am able to attain the objects of my invention and provide an analyzing ocular which is compensated for astigmatism. General purpose microscopes can be cheaply and readily converted into polarization microscopes by the use of my invention. While I have described my invention with reference to microscopes, obviously it is of wide application and can be substituted for the ocular of any optical instrument when polarization effects are to be observed. Various modifications can, of course, be made without departing from the spirit of my invention or the scope of the appended claims.

I claim:

1. In an optical instrument, an ocular comprising a field lens, the emergent rays from which are not collimated, an analyzing prism and an eye lens assembly, said eye lens assembly having a spherical power so related to said field lens as to combine with the field lens to form an ocular and having a cylindrical power equal and opposite to the astigmatism introduced by the non-collimated rays passing through the analyzing prism.

2. An ocular comprising a field lens, the emergent rays from which are not collimated, an analyzing prism and an eye lens assembly, said eye lens assembly comprising crossed cylindrical lenses so spaced and so related to the analyzing prism and to each other as to form an astigmatic system neutralizing the astigmatism of the prism.

3. An analyzing ocular comprising a field lens, the emergent rays from which are not collimated, an analyzing prism, a plano convex cylindrical lens having its axis parallel to the plane of polarization of the emergent beam and a second plano convex cylindrical lens having its axis perpendicular to the axis of said first cylindrical lens, said cylindrical lenses being of such power and being so spaced relative to the prism and to each other as to compensate for the astigmatism of the prism.

LEON V. FOSTER.